US010740515B1

(12) United States Patent
Kaur et al.

(10) Patent No.: US 10,740,515 B1
(45) Date of Patent: Aug. 11, 2020

(54) DEVICES AND METHODS FOR TEST POINT INSERTION COVERAGE

(71) Applicant: Cadence Design Systems, Inc., San Jose, CA (US)

(72) Inventors: Jagjot Kaur, Milpitas, CA (US); Priyanka Dasgupta, Carolina Springs (AU); Vivek Chickermane, Ithaca, NY (US); Gopi Kudva, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 3 days.

(21) Appl. No.: 16/224,592

(22) Filed: Dec. 18, 2018

(51) Int. Cl.
*G06F 17/50* (2006.01)
*G06F 30/30* (2020.01)
*G01R 31/317* (2006.01)
*G06F 30/3323* (2020.01)
*G06F 111/04* (2020.01)
*G06F 111/20* (2020.01)

(52) U.S. Cl.
CPC ....... *G06F 30/30* (2020.01); *G01R 31/31724* (2013.01); *G01R 31/31727* (2013.01); *G06F 30/3323* (2020.01); *G06F 2111/04* (2020.01); *G06F 2111/20* (2020.01)

(58) Field of Classification Search
CPC .. G06F 30/30; G06F 30/3323; G06F 2111/20; G06F 2111/04; G01R 31/31724; G01R 31/31727
See application file for complete search history.

(56) References Cited

U.S. PATENT DOCUMENTS

| | | | | |
|---|---|---|---|---|
| 2001/0052094 | A1* | 12/2001 | Hamidi | G01R 31/318583 714/724 |
| 2003/0023941 | A1* | 1/2003 | Wang | G06F 30/33 716/103 |
| 2005/0076278 | A1* | 4/2005 | Vermeulen | G01R 31/318552 714/731 |

(Continued)

OTHER PUBLICATIONS

Devta-Prasanna, Narendra, et al., "Clock Gate Test Points", 2010 IEEE International Test Conference, Austin, TX, (Nov. 2010), 10 pgs.

(Continued)

*Primary Examiner* — Nghia M Doan
(74) *Attorney, Agent, or Firm* — Schwegman Lundberg & Woessner, P.A.

(57) ABSTRACT

Systems, methods, media, and other such embodiments described herein relate to insertion of test points in circuit design and associated test coverage for a circuit design. One embodiment involves a circuit design with a plurality of circuit elements and a plurality of clock gating logic elements. A first node coupled to a first circuit element is selected for insertion of a test point circuit element. Elements of the design are identified that contribute to a data state of the first node, and clock elements for these identified design elements are traced. An ungated clock input node from this trace is selected, and the clock input from this node is connected to the test point circuit element. The circuit design is then updated with this connection. In various embodiments when multiple ungated clock input nodes are identified by the trace, additional criteria are used to select among the ungated clock input nodes.

20 Claims, 6 Drawing Sheets

(56) References Cited

U.S. PATENT DOCUMENTS

2009/0288046 A1* 11/2009 Dorsch ................. G06F 30/30
716/103

OTHER PUBLICATIONS

Vranken, Harald, et al., "Impact of Test Point Insertion on Silicon Area and Timing during Layout", Proceedings Design, Automation and Test in Europe Conference and Exhibition, Paris, FR, (Feb. 2004), 6 pgs.

Yang, Joon-Sung, et al., "Test Point Insertion with Control Point by Greater Use of Existing Functional Flip-Flops", ETRI Journal, 36(6), (Dec. 2014), 942-952.

* cited by examiner

DEVICES AND METHODS FOR TEST POINT INSERTION COVERAGE

TECHNICAL FIELD

Embodiments described herein relate to electronic design automation (EDA), and to systems, methods, devices, and instructions for generating circuit designs with test points.

BACKGROUND

Electronic design automation (EDA) is a category of systems for assisting with the design of electronic systems and devices. Large, integrated circuit designs are often assembled from previously designed blocks, which enables reduced turnaround times for generation of an integrated circuit. Beyond the basic functional elements of a circuit design, test points may be inserted into the design to allow testing of the circuit after fabrication. Not all nodes within the circuit will include test points, as addition of test points increases cost. EDA may thus include systems for efficient test coverage analysis and test point insertion.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments described herein relate to EDA and to methods, computer media, and devices used for analyzing, optimizing, and creating electronic circuits.

Particular embodiments include improved design for testability (DFT) as part of EDA operations in creating and updating circuit designs. DFT plays an important role in improving product yield for circuits. Test coverage and test efficiency are important parameters for design quality with DFT techniques. DFT goals include high test coverage that is achieved if all the signals of the circuit are fully observable and controllable. 100% test coverage is difficult to achieve and is likely to be inefficient. To save testing costs, fewer test patterns with higher coverage may be used to generate efficiency as part of DFT and a resulting circuit design. Embodiments described herein used test point insertion performed in an efficient method to improve the designs testability and improve test coverage with controllable and/or observable logic elements. This is done with an enhanced test point insertion approach that includes clock gating analysis to improve quality of test point insertion. In some embodiments, an associated testability analysis for test point selection is done with a simplifying assumption of idealized clock trees. When test points are actually inserted in the logic, the clock gates and other clock control logic reduce the effectiveness of test points. This results in a gap between estimated coverage improvement and the achieved coverage improvement. Embodiments described herein provide improvements associated with reducing the gap between estimated coverage improvement and actual coverage improvement.

Figure 1:
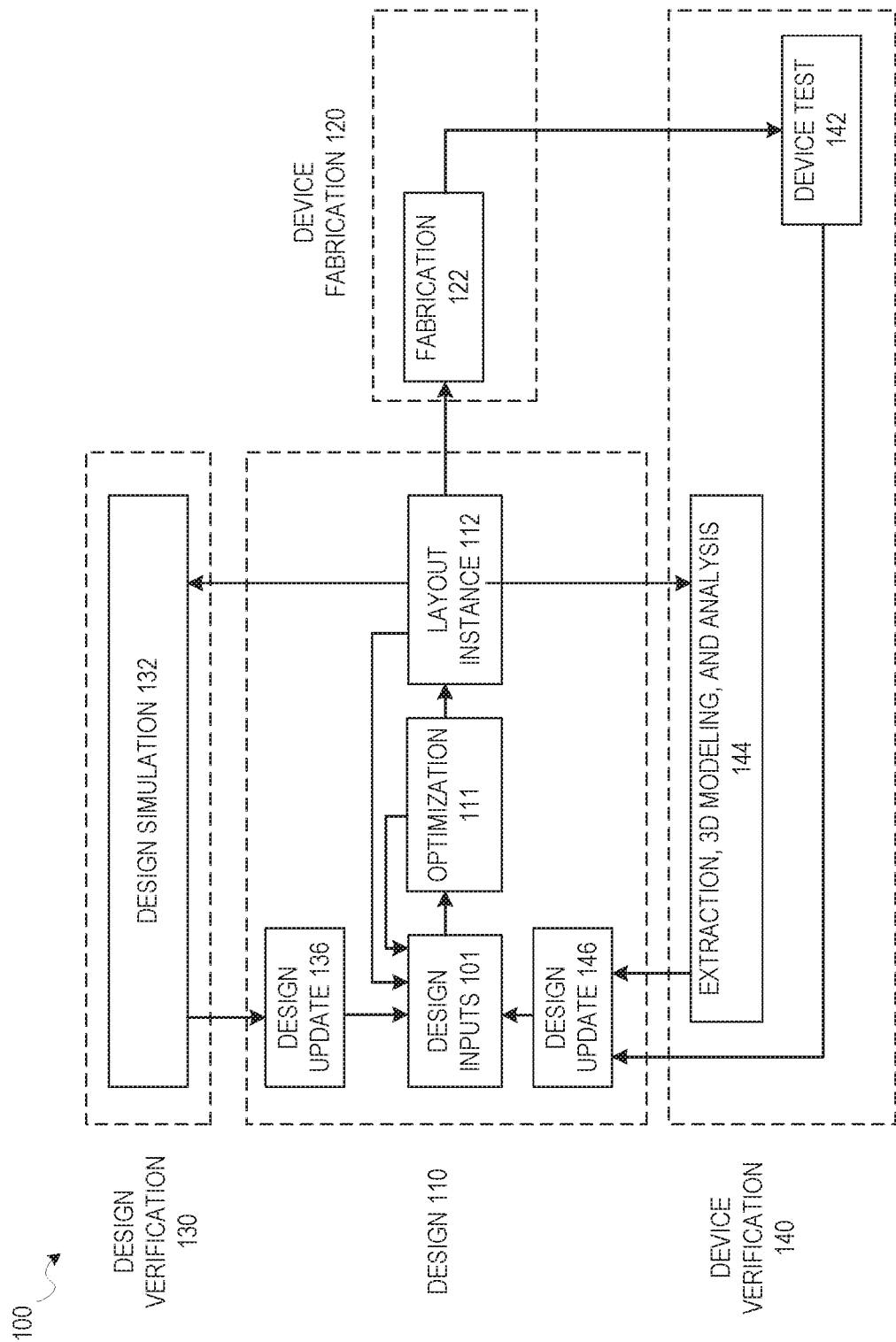
FIG. 1 is a diagram illustrating one possible design process flow which includes elements for test point insertion, in accordance with some embodiments.

FIG. 1 is a diagram illustrating one possible design process flow that includes elements for test point insertion and DFT, in accordance with some embodiments. This includes possible design process flows for timing and signal integrity analysis to generate a circuit design and an associated circuit, in accordance with various example embodiments, and operations for modifying such circuits automatically to generate circuit designs with efficient test systems and test points. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a circuit design are generated. The initial strategy, tactics, and context for the device to be created are also generated in the design input operation 101, depending on the particular design algorithm to be used. A testability analysis may be performed at any point following generation of the initial design. Similarly, full operations for DFT and test point insertion may be performed following generation of the initial design or at any place in the circuit design process flow described herein.

Updates to a design may be performed at any time to improve expected operation of a circuit design. For example, in various embodiments, constraints for blocks in a circuit design may be generated prior to routing of connections in a circuit design; after routing; during register transfer level (RTL) operations; or as part of a final signoff optimization or verification prior to a device fabrication operation 122. Certain embodiments of operations described herein for generating or updating circuitry for test coverage may therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112, The layout describes the physical layout dimensions of the device that match the design inputs. This layout may then be used in a device fabrication operation 122 to generate a device, or additional testing and design updates may be performed using designer inputs or automated updates based on a design simulation 132 operations or extraction, three-dimensional (3D) modeling, and analysis 144 operations. Once the device is generated, the device can be tested as part of device test 142 operations, and layout modifications generated based on actual device performance.

Design updates 136 from design simulation 132, design updates 146 from device test 142 or extraction, 3D modeling, and analysis 144 operations, or direct design input operation 101 may occur after an initial layout instance 112 is generated. In various embodiments, whenever design inputs are used to update or change an aspect of a circuit design, a timing analysis and optimization operation 111 may be performed.

Figure 2:
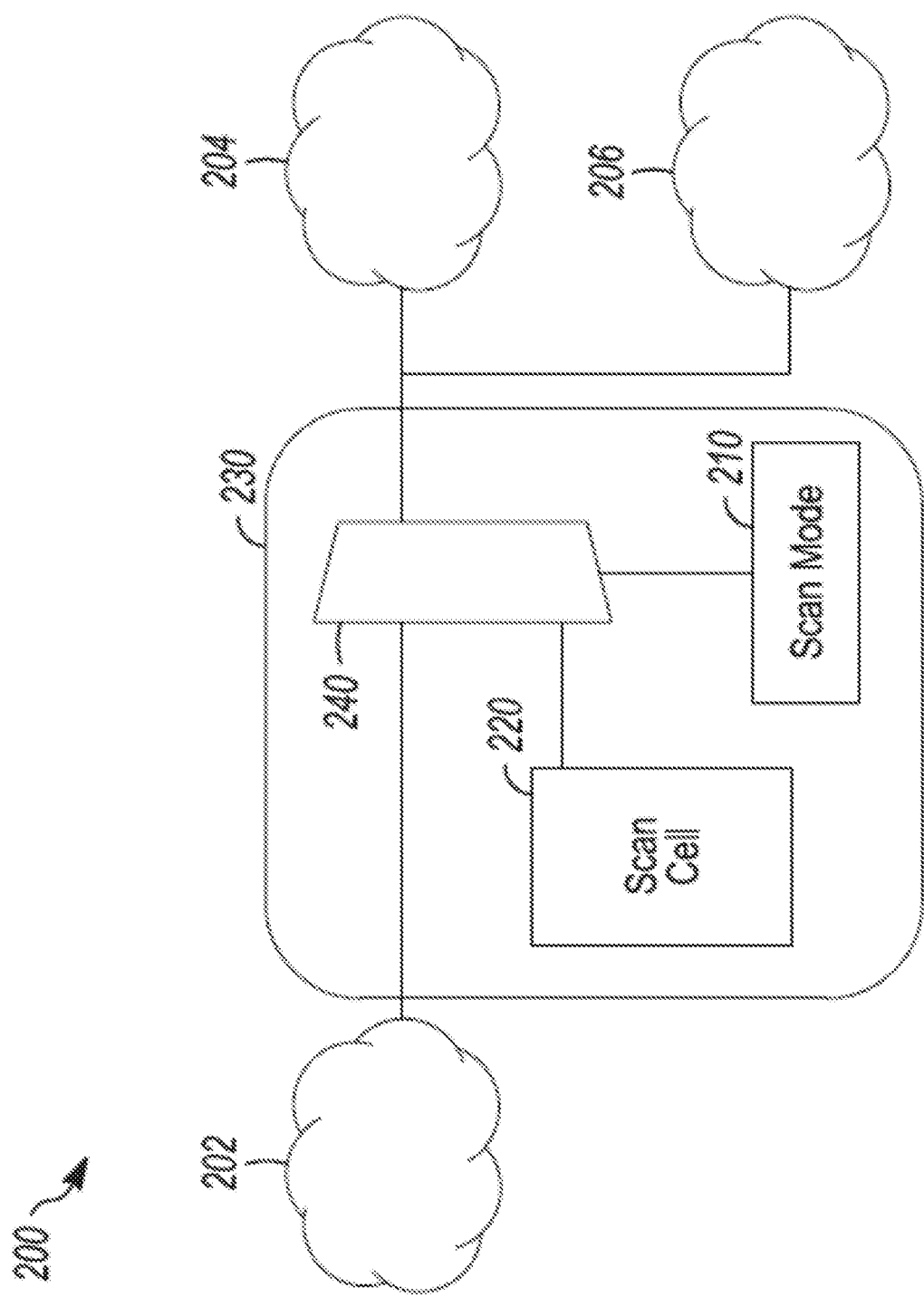
FIG. 2 illustrates aspects of test point insertion, in accordance with some embodiments.

FIG. 2 illustrates aspects of test point insertion, in accordance with some embodiments. FIG. 2 particularly describes system 200, which includes a circuit after the insertion of a test point 230. The circuit of system 200 includes elements 202, 204, and 206. Test point 230 includes test circuitry 240, which is controllable via inputs to implement scan cell 220 or scan mode 210 functionality. Combinations of circuit elements such as elements 202, 204, and 206, which are connected via routing lines, are considered controllable if both the 0 signals and 1 signals can be propagated through scan patterns to elements of the circuit. In FIG. 2, elements 204 and 206 are uncontrollable points in the absence of test point 230. By inserting test point 230 among the connections between elements 202, 204, and 206, the controllability of elements 204 and 206 is adjusted. With the use of scan cell 220, elements 204 and 206 can be controlled to either a 1 or a 0. In the simple circuit with only a T connection from elements 202, 204, and 206, this is not possible. Test circuitry 240 (e.g. a multiplexer) allows elements 204 and 206 to be controlled during test operations. In a normal functional operational mode, elements 204 and 206 receive a value from elements 202 and are not separately manipulated due to the functional design of the system 200.

Figure 3:
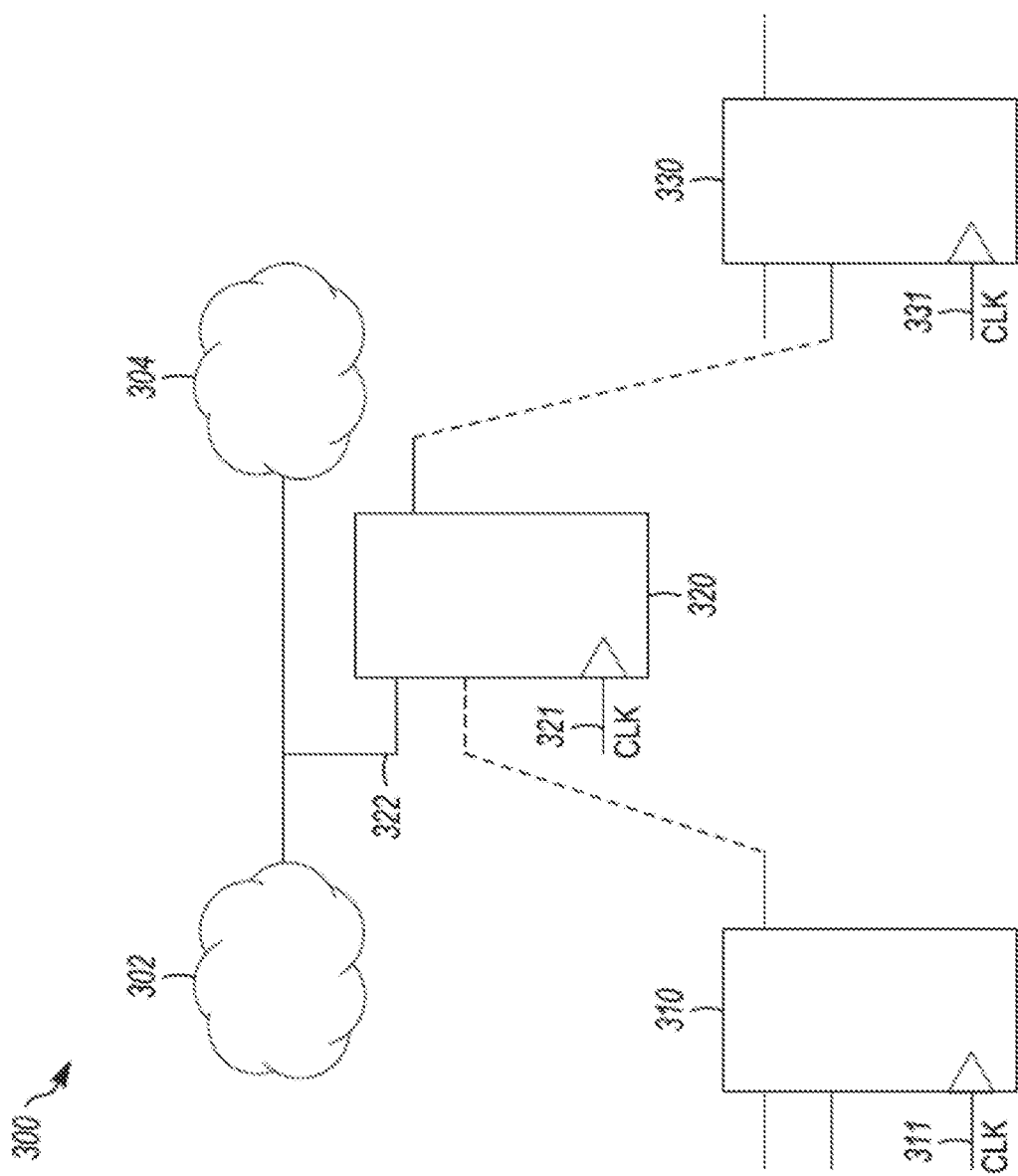
FIG. 3 illustrates aspects of test point insertion, in accordance with some embodiments.

FIG. 3 illustrates aspects of test point insertion, in accordance with some embodiments. FIG. 3 particularly illustrates system 300 with insertion of an observation test point into a circuit including element 302 connected to element 304. As part of DFT, observability refers to the ability to measure the state of the logic signal. When a node is observable, this means that the value at the node can be shifted out through scan patterns and can be observed through scan out ports. In a simple circuit including only circuit element 302 connected to circuit element 304, the output signal of element 302 is not observable. To have test coverage for the output node of element 302, circuitry is added to make this node observable. One common type of test point insertion is the addition of circuitry to create nodes connected to inputs of an analog block not having a scan chain inside. Since analog blocks do not have scan chains, the input nodes are not observable in a normal scenario. This renders the entire input logic unobserved. The addition of observation test point element 320 allows the state of the node between elements 302 and 304 to be observed by capturing data from the output element 302 via input 322. During observation operations of a test mode to capture the state of the node with shift—enable not active, the scannable observation test point element 320 is in a non-scan mode and captures the value from the output of element 302. Alternatively, during a scan shift cycle with shift enable active, the value captured in the observation test point element 320 (e.g., a flip-flop) is scanned out through a scan chain which includes elements 310 and 330 (clocked by corresponding clock inputs 311 and 331) as well as observable test point element 320 with a clock signal provided at clock input 321. As part of such a structure, different elements in the scan chain may capture the signal value at different nodes and then relay out these captured values through other elements of the chain. Each element scan chain may thus both capture a value from a node and communicate values from that node and other nodes to test control circuitry. During certain test processes for a circuit design, random patterns of data are input through the circuit, so that data passes through the node between circuit elements 302 and 304. Observing data at this node via data input 322 using a clock input 321 is part of test coverage for the overall circuit design and may identify when unexpected errors occur. The greater the percentage of the overall circuit that has test coverage, the less likely it is that unexplained errors may occur.

In some systems, DFT software provides capabilities to analyze test coverage in a circuit design. This may include functionality to analyze the testability of a circuit design by performing automatic test pattern generator-based analysis. In some embodiments, this includes logic analysis to identify test points to improve random pattern testability of designs tested using random resistance fault analysis (e.g. logical built-in self-test (LBIST)). In some embodiments, this may include performance of the compression analysis to identify test points for reducing pattern counts for automatic test pattern generation (ATPG) compression and full scan designs. In some embodiments, this includes a deterministic fault analysis to identify test points to improve test coverage by analyzing the deterministic untestable and inactive faults on full scan designs.

Random resistance analysis identifies sections of a design that are resistant to testing by flat, uniformly distributed random patterns and provides analysis information to help improve the random pattern testability of the design. This analysis information is based on signal probabilities computed by simulating random patterns and counting the number of times each net takes on the values 0, 1, X, and Z. Random resistance analysis then uses the faults that were not tested by the random pattern simulation to determine points in the design that tend to block fault activation and propagation to observable points. These points then become the potential points for Control and Observation test points. While doing random pattern testability analysis (RPTA), ATPG tools assume that each observation test point will receive a clock during actual pattern generation. Clock gating is a widely used technique for reducing the dynamic power consumption in modern integrated circuits. In may circuits, a significant number of the scan cells in the design are controlled by clock gates. Furthermore, the functional logic for operating the clock gates can be fairly complex and it can bear a substantial impact on test. It may take a substantial number of patterns for an ATPG tool to control the clock gates, especially when there are levels of Clock Gating inserted in design. This results in problems whereby ATPG tools do 'Test point Analysis' with the assumption that each generated pattern will be able to propagate a clock to the inserted test point during capture operation. During actual pattern generation after 'test point insertion,' an ATPG tool may need to generate a high number of patterns to control the clock gates and make them transparent for clock propagation. This results in a coverage correlation gap between the estimated coverage with a given number of random patterns versus the achieved coverage with the same number of random patterns after test point insertion. This may result in an extreme impact on test coverage. For designs with observability and controllability problems, test points are analyzed and inserted, with newly inserted test points increasing test coverage and decrease pattern count (e.g. the number of input test patterns required for sufficient test coverage) while at the same time increase circuit area by virtue of the additional logic being added to the design. If inserted test points do not result in the intended coverage improvement, the design is deteriorated without providing benefits. Embodiments described herein address such problems with a correct by construction design to verify that inserted test points are active during scan and therefore providing improvements.

Figure 4:
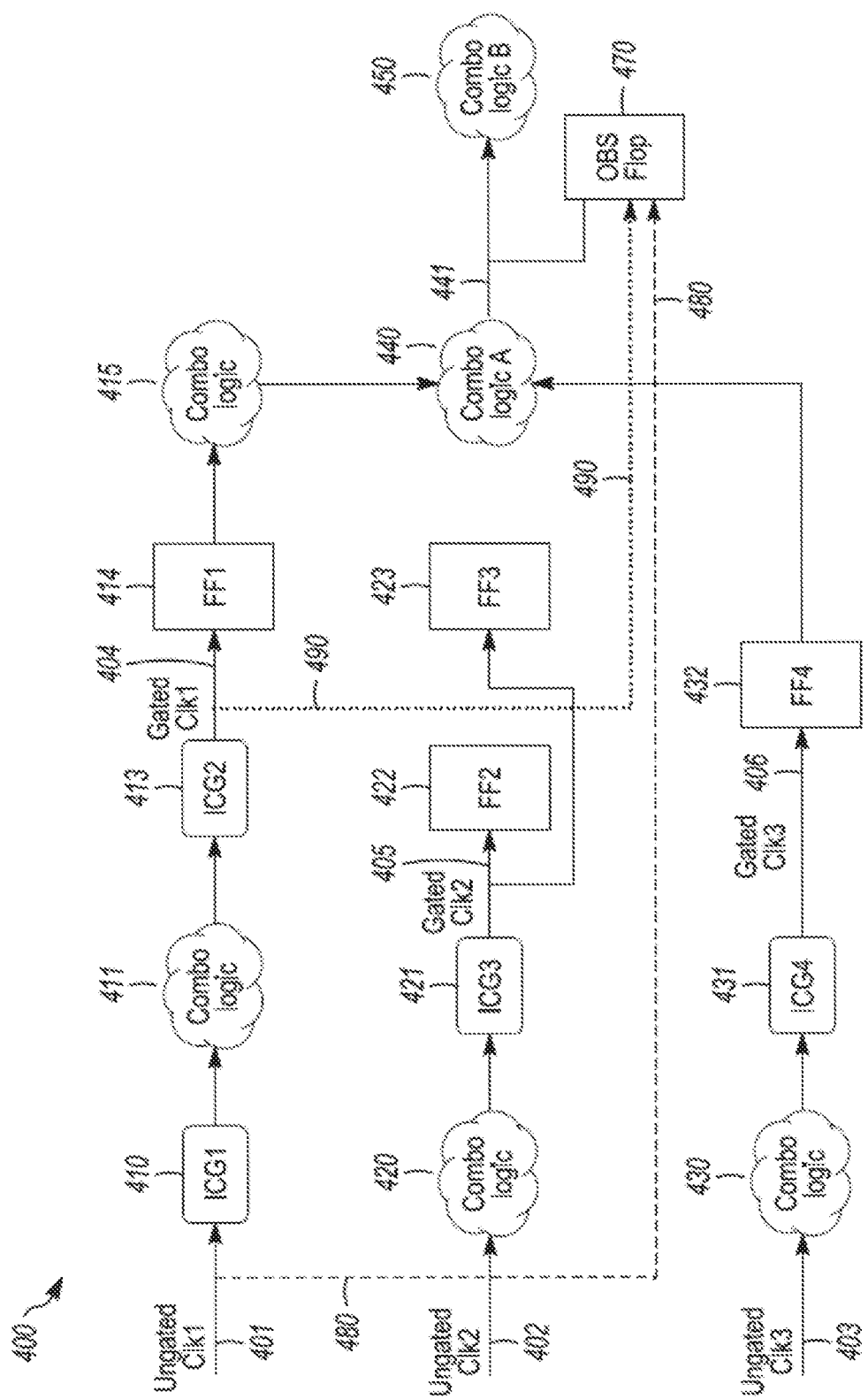
FIG. 4 illustrates aspects of test point insertion, in accordance with some embodiments.

FIG. 4 illustrates aspects of test point insertion, in accordance with some embodiments. FIG. 4 illustrates a circuit design 400 with an observation test point element 470 at the output node of element 440 and the input of element 450, shown as node 441. While circuit design 470 illustrates test point insertion for node 441, any number of test points may be inserted for any number of nodes in different embodiments. The circuit design 400 also includes ungated clock inputs 401, 402, and 403, as well as circuit elements 410-415, 420-423, and 430-432. These circuit elements include input clock gate circuit elements 410, 413, 421, and 431. The circuit elements also include flip-flop circuit elements 414, 422, 423, and 432 as well as combination logic circuit elements 420, 430, 411, 415, 440, and 450. When designing observation test point element 470, a connection is made to a node to provide an appropriate clock to the observation test point element 470. Prior systems trace the clocks of the flip-flop elements from the fan-in cone of the element 440 output node being observed by observation test point element 470, and would pick the gated clocks 404, or 406 of one of the flip-flop circuit elements 414 or 432. In the embodiment of FIG. 4, a clock input 490 in such a previous system is illustrated as connected to the gated clock input to flip-flop circuit element 414. Such use of a gated clock for test point insertion makes ATPG tools generate a higher number of patterns in order to make clock gates transparent. This creates a correlation gap between Modus Random Testability Analysis estimated coverage and the achieved coverage following genus test point insertion.

Instead of using such gated clock inputs, embodiments described herein use ungated clock inputs from earlier in the clock path. Such a selected clock input for observation test point element 470 is shown by clock input 480, which uses ungated clock input 401 for the clock input of observation test point element 470. As part of an operation to select such a clock input for a test point, a test analysis traces the clock of the logic circuitry that feeds into the node being tested back through all levels of clock gating logic. In circuit design 400, this involves tracing back the clock inputs to flip flop circuit elements 414 and 432 back through clock gating logic elements 413, 431, and 410 to the ungated input clocks 401, 402, and 403. The ungated clock input from the last identified clock gating logic (e.g., the last element of the trace-back or the earliest input in the clock tree) is selected to provide the clock to observation test point element 470, By using an earliest ungated clock for test point insertion, a TPG tool may use a lower number of patterns during test to make clock gates transparent. This provides better correlation between Modus Random Testability Analysis and the actual achievement test point coverage posts genus point insertion.

Table 1 below illustrates an example distinction between coverage operations using the previous systems selecting test point clocks using gated clock inputs versus current embodiments, which select the earliest ungated clock input as described above.

TABLE 1

Design A - Total Flops 211,229
RPTA Estimated LBIST Coverage-95% with 5K Random Patterns

| Parameter | Before Algorithm | After Algorithm |
| --- | --- | --- |
| # Test-points Inserted | 30,912 | 30,912 |
| # Random Patterns | 5,000 | 5,000 |
| Achieved LBIST Coverage | 91.30% | 94.66% |

TABLE 1-continued

Design A - Total Flops 211,229
RPTA Estimated LBIST Coverage-95% with 5K Random Patterns

| Parameter | Before Algorithm | After Algorithm |
| --- | --- | --- |
| # Random Patterns to reach 95% Coverage | 16,000 | 5,000 |

As may be seen in Table 1, for an example circuit used to test the differences between test point insertion structures and embodiments with test point insertion structures as described herein, the current embodiments in which the clock for test point elements is selected from earlier in the clock tree provide an improvement by enabling greater coverage for a given number of patterns or by enabling an equal coverage using a lower number of patterns. Thus, embodiments described herein provide improvement to computing devices by improving the efficiency of test circuitry in such circuit designs.

Figure 5:
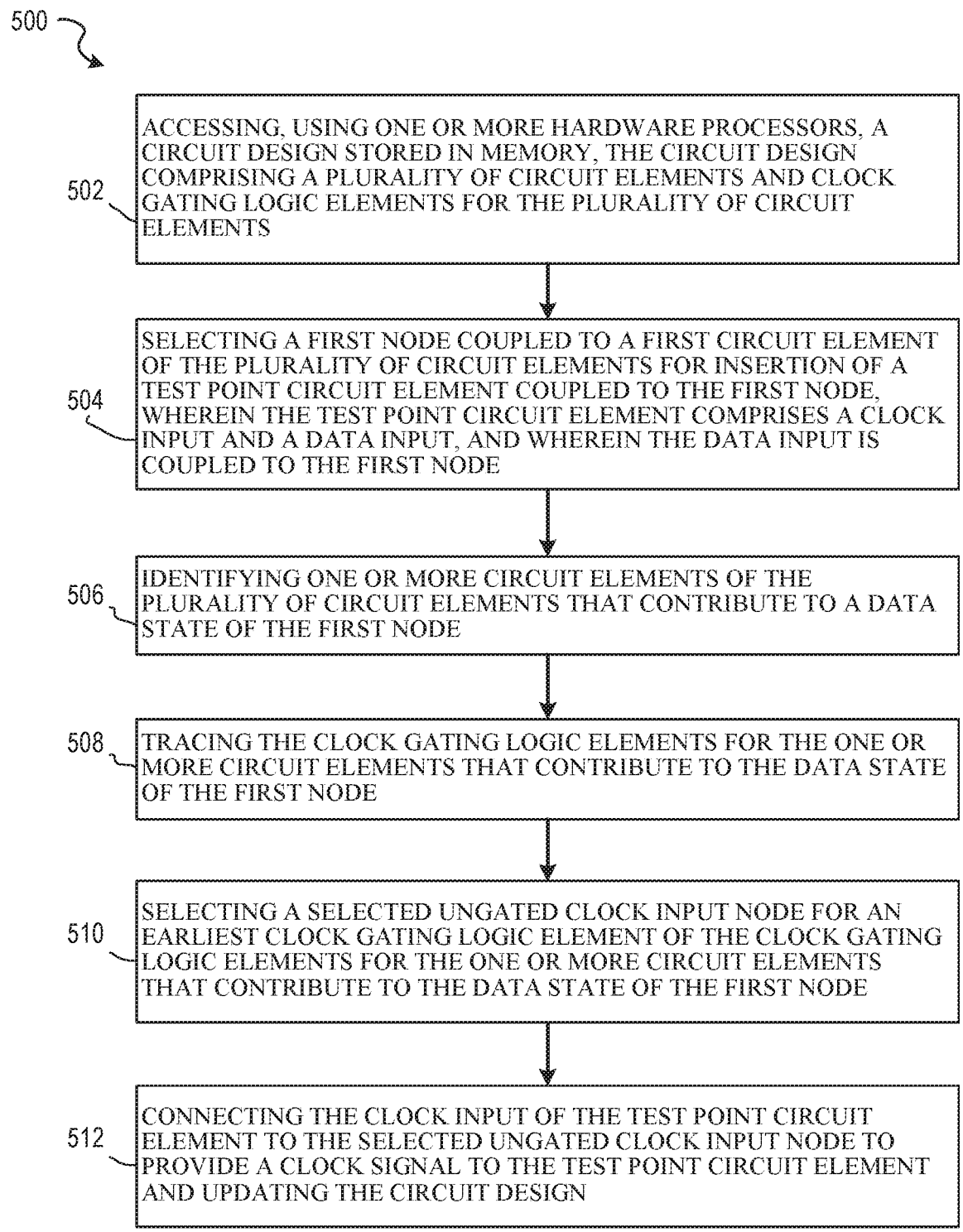
FIG. 5 illustrates a method for test point insertion, in accordance with some embodiments.

FIG. 5 illustrates a method test point insertion in accordance with some embodiments. FIG. 5 particularly describes a method 500 for test point insertion and improved test point coverage, in accordance with some embodiments. In some embodiments, method 500 is performed by an EDA computing device with one or more processors, which may be configured for additional EDA operations as part of a circuit design process, which may involve additional operations from FIG. 1. In some embodiments, method 500 is embodied in computer-readable instructions stored in a non-transitory storage device, such that when the instructions are executed by one or more processors of a device, the device performs method 500.

Method 500 begins with operation 502 accessing, using one or more hardware processors, a circuit design stored in memory, the circuit design comprising a plurality of circuit elements and clock gating logic elements for the plurality of circuit elements. The circuit design may be stored in memory by EDA software or as part of a design generated using various different systems. Method 500 may be part of specialized DFT operations or part of a larger EDA system that includes DFT or other functions for test point insertion.

A first node is then selected for test point insertion in operation 504. The first node may be selected as part of a selection of any number of nodes for test point insertion for the circuit design to achieve target test coverage or may be an addition of a test point in a circuit which already has significant test coverage. The first node is coupled to a first circuit element of the plurality of circuit elements for insertion of a test point circuit element coupled to the first node, where the test point circuit element comprises a clock input and a data input, and wherein the data input is coupled to the first node. Operation 506 then involves identifying one or more circuit elements of the plurality of circuit elements that contribute to a data state of the first node, and operation 508 involves tracing first clock gating logic elements for the one or more circuit elements that contribute to the data state of the first node. This information is then used in operation 510 for selecting a selected ungated clock input node for a clock gating logic element of the first clock gating logic elements.

Identification of the circuit elements and tracking of the clock gating logic identify the possible options for sourcing a clock signal for the test circuitry to be added for the selected node. In some embodiments with insertion of large numbers of test points, certain test points may use embodiments described herein for selecting an ungated clock input node while others select a gated clock input node. Selection of the particular clock source for different test point circuitry may depend on different criteria in different embodiments. In some embodiments, combinations of physical space and layout may be considered, while in other embodiments these considerations are low priority. In various embodiments, different signal integrity and cost criteria may additionally be considered. In other embodiments, only placement in the clock path for test coverage is considered.

After the selection in operation 510, operation 512 involves connecting the clock input of the test point circuit element to the selected ungated clock input node to provide a clock signal to the test point circuit element. Then the circuit design is updated with a connection from the clock input of the test point circuit element to the selected ungated clock input node to create an updated circuit design. This may be repeated for any number of nodes to achieve targeted test coverage. Additionally, such operations may be interspersed with other operations for improving circuit performance, test coverage, or any other criteria associated with circuit design (e.g. as described in FIG. 1. above).

Some such embodiments operate where the clock gating logic element is an earliest clock gating logic element of the first clock gating logic elements for the one or more circuit elements that contribute to the data state of the first node. In other embodiment, the selected ungated clock input node is selected at least in part on a position of the node within the circuit design.

Some such embodiments further involve selecting a number of random input data patterns for the circuit design and estimating a percentage of LBIST coverage provided for the circuit design as updated with the connection from the clock input of the test point circuit element to the selected ungated clock input node. In other embodiments, any number of other processes for estimating coverage and determining nodes for test point insertion may be used. Some embodiments involve adding additional test point circuit elements to the circuit design to achieve a threshold estimated percentage of LBIST coverage with the number of random input data patterns.

In some embodiments, operations for adding additional test points involve the following operations. A second node coupled to a second circuit element of the plurality of circuit elements is selected for insertion of a second test point circuit element coupled to the second node, where the second test point circuit element comprises a second clock input and a second data input, and wherein the second data input is coupled to the second node. Then operations for identifying second one or more circuit elements of the plurality of circuit elements that contribute to a second data state of the second first node are performed, followed by operations for tracing second clock gating logic elements for the one or more circuit elements that contribute to the second data state of the second node and selecting a second selected ungated clock input node for a second earliest clock gating logic element of the second clock gating logic elements for the second one or more circuit elements that contribute to the second data state of the second node. The second clock input of the second test point circuit element is then connected to the second selected ungated clock input node to provide a second clock signal to the second test point circuit element. Following this, just as for the first test point insertion, the circuit design is updated with a second connection from the second clock input of the second test point circuit element to the second selected ungated clock input node. In some such embodiments the second selected ungated clock input node is the first selected ungated clock input node. In other embodiments, the second selected ungated clock input node is different than the first selected ungated clock input node.

Some embodiments further involve generating a set of masks from the updated circuit design for use in generating an integrated circuit based on the updated circuit design. In some embodiments, the operations then proceed with generating or initiating generation of a set of masks from the updated circuit design for use in generating an integrated circuit comprising the updated circuit design. The component arrangement defined and generated in the above operations may then be used to fabricate (e.g., generate) or initiate generation of an integrated circuit using the component arrangement. In various embodiments, various devices, systems, and methods are used to fabricate devices based on the updated circuit design. In some embodiments, this includes generation of masks and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CND), or any such similar processes. Some embodiments may use files generated according to operations described herein for chemical mechanical polishing, where a chemical slurry with etchant agents is used to planarize to the wafer surface; for oxidation where dry oxidation or wet oxidation molecules convert silicon layers on top of the wafer to silicon dioxide; for ion implantation where dopant impurities are introduced into a semiconductor using a patterned electrical field; or for diffusion where bombardment-induced lattice defects are annealed. Thus, in various embodiments, systems and operations include not only computing devices for generating updated circuit design files, but also hardware systems for fabricating masks, controlling integrated circuit (IC) fabrication hardware, and the hardware and operations for fabricating a circuit from a circuit design (e.g., component arrangement) generated in accordance with various embodiments described herein.

Additionally, it will be apparent that any apparatus or operations described herein in accordance with various embodiments may be structured with intervening, repeated, or other elements while still remaining within the scope of the contemplated embodiments. Some embodiments may include multiple receivers, along with any other circuit elements. Some embodiments may function with described operating modes as well as other operating modes. The various embodiments described herein are thus presented as examples, and do not exhaustively describe every possible implementation in accordance with the possible embodiments.

Figure 6:
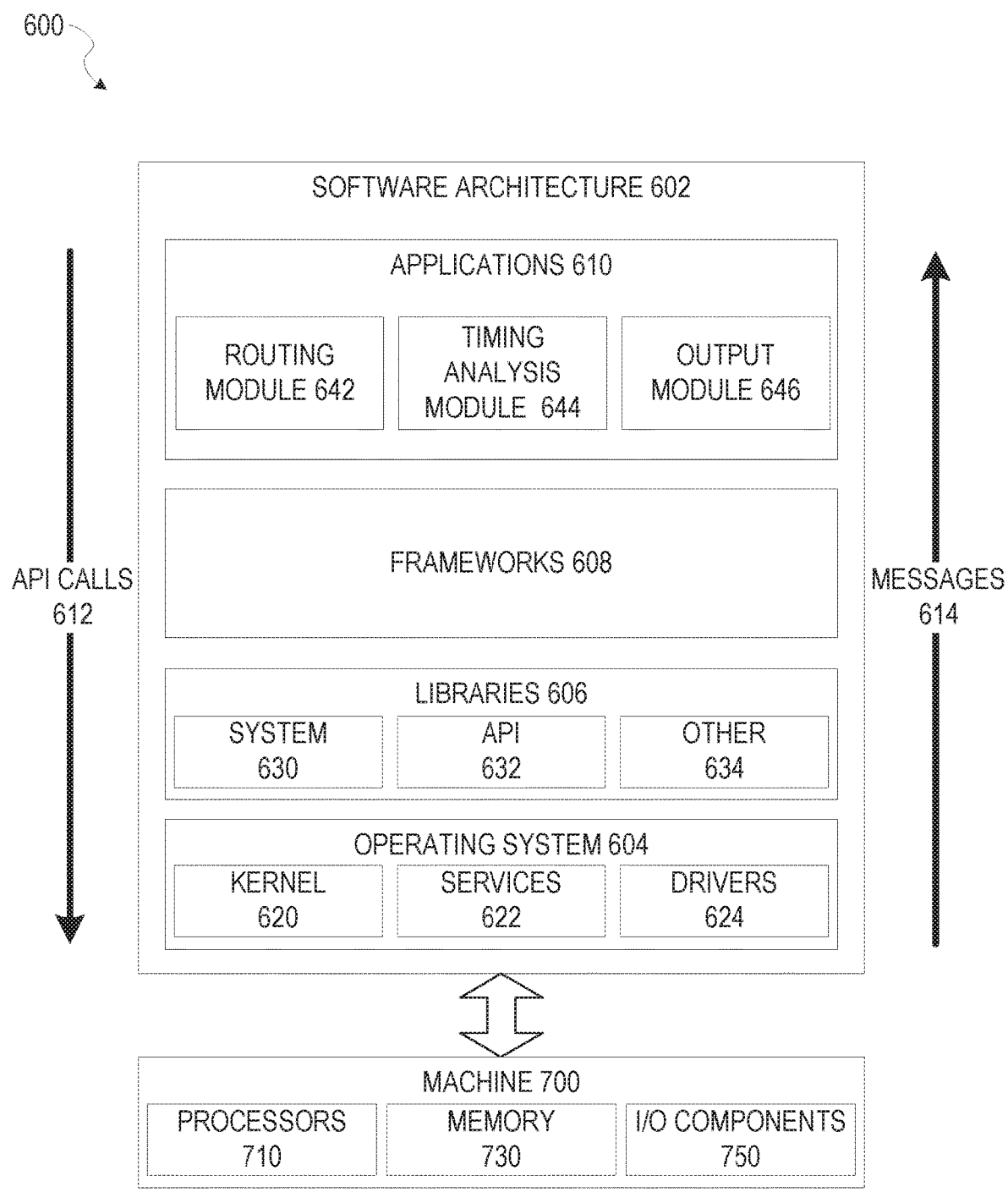
FIG. 6 is a block diagram illustrating an example of a software architecture that may be operating on an EDA computer and used with methods for test point insertion to update a circuit design, according to some example embodiments.

FIG. 6 is a block diagram 600 illustrating an example of a software architecture 602 that may be operating on an FDA computer and used with methods for modifying a balanced clock structure, according to some example embodiments.

Software architecture 602 can be used as an electronic design automation computing device to implement any of the methods described above. Aspects of software architecture 602 may, in various embodiments, be used to store circuit designs and execute timing analysis or optimization in an EDA environment to generate circuit designs, with physical devices generated using these circuit designs.

FIG. 6 is merely a non-limiting example of a software architecture 602, and it will be appreciated that many other architectures can be implemented to facilitate the functionality described herein. In various embodiments, the software architecture 602 is implemented by hardware such as machine 700 that includes processors 710, memory 730, and input/output (I/O) components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments. In various embodiments, any client device, server computer of a server system, or any other device described herein may operate using elements of software architecture 602. An EDA computing device described herein may additionally be implemented using aspects of the software architecture 602, with the architecture 602 adapted for operating to perform clock synthesis and modification of balanced clock structures in accordance with embodiments herein.

In one embodiment, an FDA application of applications 610 performs routing tree generation and/or adjustments, according to embodiments described herein, using various modules within software architecture 602. For example, in one embodiment, an EDA computing device similar to machine 700 includes memory 730 and one or more processors 710. The processors 710 implement a routing module 642 to generate an updated routing tree from an initial routing tree based on criteria for an integrated circuit design. The processors 710 also implement a timing analysis module 644 to determine whether an updated routing tree meets timing criteria for the circuit design. The routing tree is finalized by an output module 646 if the criteria/design thresholds are met, and updated by routing module 642 if the criteria/design thresholds are not met.

In some embodiments, processor-implemented output module 646 may then be used to update a display of I/O components 750 of the EDA computing device with data associated with the updated routing tree generated by the process.

In various other embodiments, rather than being implemented as modules of one or more applications 610, some or all of modules 642, 644, and 646 may be implemented using elements of libraries 606 or operating system 604.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 such as libraries of multi-instance blocks for use in an EDA environment or other libraries that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and 3D in a graphic content on a display), database libraries (e.g., SQLite to provide various relational database functions), web libraries (e.g., WebKit to provide web browsing functionality), and the like. The libraries 606 may also include other libraries 634.

The software frameworks 608 provide a high-level common infrastructure that can be utilized by the applications 610, according to some embodiments. For example, the software frameworks 608 provide various graphic user interface (GUI) functions, high-level resource management, high-level location services, and so forth. The software frameworks 608 can provide a broad spectrum of other APIs that can be utilized by the applications 610, some of which may be specific to a particular operating system 604 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files, and viewdefinition files are examples that may operate within a software architecture 602, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors 710 or processor-implemented modules are distributed across a number of geographic locations.

FIG. 6 includes machine 700, which is, according to some embodiments, able to read instructions from a machine-readable medium (e.g., a machine-readable storage medium) and perform any one or more of the methodologies discussed herein. In some embodiments, the machine 700 may operate with instructions (e.g., software, a program, an application, an applet, an app, or other executable code) for causing the machine 700 to perform any one or more of the methodologies discussed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions, sequentially or otherwise, that specify actions to be taken by the machine 700. Further, while only a single machine 700 is illustrated, the term "machine" shall also be taken to include a collection of machines 700 that individually or jointly execute the instructions to perform any one or more of the methodologies discussed herein.

In various embodiments, the machine 700 comprises processors 710, memory 730, and I/O components 750, which can be configured to communicate with each other via a bus. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, multiple processors that may execute the instructions. The term "processor" is intended to include multi-core processors 710 that may comprise two or more independent processors (also referred to as "cores") that can execute instructions contemporaneously.

As used herein, the term "memory" refers to a machine-readable medium able to store data temporarily or permanently and may be taken to include, but not be limited to, random-access memory (RAM), read-only memory (ROM), buffer memory, flash memory, and cache memory. The term "machine-readable medium" or "computer-readable medium" should be taken to include a single medium or multiple media (e.g., a centralized or distributed database, or associated caches and servers) able to store the instructions. The term "machine-readable medium" shall also be taken to include any medium, or combination of multiple media, that is capable of storing instructions for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

In some embodiments, outputs from an EDA computing device may include design documents, files for additional steps in a design flow 100, or as part of outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody, illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method comprising:
   accessing, using one or more hardware processors, a circuit design stored in memory, the circuit design comprising a plurality of circuit elements and a plurality of clock gating logic elements for the plurality of circuit elements, the plurality of circuit elements comprising a first circuit element;
   selecting, using one or more hardware processors, a first output node coupled to a data input of the first circuit element for insertion of a test point circuit element between the first output node and the data input of the first circuit element, wherein the test point circuit element comprises a clock input and the data input;
   identifying, using one or more hardware processors, one or more circuit elements of the plurality of circuit elements that contribute to a data state of the first output node;
   tracing, using one or more hardware processors, first clock gating logic elements for the one or more circuit elements that contribute to the data state of the first output node;
   selecting, using one or more hardware processors, an ungated clock input node for a clock gating logic element of the first clock gating logic elements; and
   connecting, using one or more hardware processors, the clock input of the test point circuit element to the ungated clock input node to provide a clock signal to the test point circuit element; and updating, using one or more hardware processors, the circuit design stored in the memory with a connection from the clock input of the test point circuit element to the ungated clock input node to create an updated circuit design.

2. The computerized method of claim 1, wherein the clock gating logic element is an earliest clock gating logic element of the first clock gating logic elements for the one or more circuit elements that contribute to the data state of the first output node.

3. The computerized method of claim 1, wherein the ungated clock input node is selected at least in part based on a position of the ungated clock input node within the circuit design.

4. The computerized method of claim 1, further comprising:

selecting a number of random input data patterns for the circuit design; and estimating a percentage of logical built-in self-test (LBIST) coverage provided for the circuit design as updated with the connection from the clock input of the test point circuit element to the ungated clock input node.

5. The computerized method of claim 4, further comprising:

adding additional test point circuit elements to the circuit design to achieve a threshold estimated percentage of LBIST coverage with the number of random input data patterns.

6. The computerized method of claim 1, wherein the plurality of circuit elements comprises a second circuit element, and wherein the method further comprises:

selecting a second output node coupled to a second data input of the second circuit element for insertion of a second test point circuit element between the second output node and the second data input of the second circuit element, wherein the second test point circuit element comprises a second clock input and the second data input;

identifying second one or more circuit elements of the plurality of circuit elements that contribute to a second data state of the second output node;

tracing second clock gating logic elements for the second one or more circuit elements that contribute to the second data state of the second output node;

selecting a second ungated clock input node for a second earliest clock gating logic element of the second clock gating logic elements for the second one or more circuit elements that contribute to the second data state of the second output node;

connecting the second clock input of the second test point circuit element to the second ungated clock input node to provide a second clock signal to the second test point circuit element; and updating the circuit design with a second connection from the second clock input of the second test point circuit element to the second ungated clock input node.

7. The computerized method of claim 6, wherein the second ungated clock input node is the first ungated clock input node.

8. The computerized method of claim 6, wherein the second ungated clock input node is different than the first ungated clock input node.

9. A device for generating a circuit design, comprising:

a memory configured to store the circuit design, the circuit design comprising a plurality of circuit elements and a plurality of clock gating logic elements for the plurality of circuit elements; and one or more processors coupled to the memory and configured to perform operations for generating an updated circuit design, the operations comprising:

selecting a plurality of output nodes selected for test point insertion between the plurality of output nodes and corresponding test point circuit elements, wherein each of the corresponding test point circuit elements comprises a clock input and a data input, and wherein each data input is coupled to a corresponding output node of the plurality of output nodes; and for each individual output node of the plurality of output nodes selected for test point insertion, updating the circuit design with a clock signal for the clock input of each of the corresponding test point circuit elements by:

identifying a data input of an individual circuit element of the plurality of circuit elements coupled to the individual output node;

identifying one or more circuit elements of the plurality of circuit elements, other than the individual circuit element, that contributes to a data state of the individual output node;

tracing one or more clock gating logic elements for the one or more circuit elements;

selecting an ungated clock input node for a first clock gating logic element of the one or more clock gating logic elements; and connecting the clock input of the corresponding test point circuit element to the ungated clock input node to provide the clock signal to the clock input of the corresponding test point circuit element.

10. The device of claim 9, wherein the clock gating logic element is an earliest clock gating logic element of the first clock gating logic elements for the one or more circuit elements that contribute to the data state of the individual output node.

11. The device of claim 9, wherein the ungated clock input node is selected at least in part based on a position of the ungated clock input node within the circuit design.

12. The device of claim 9, wherein the one or more processors are further configured to perform operations comprising:

selecting a number of random input data patterns for the circuit design; and estimating a percentage of logical built-in self-test (LBIST) coverage provided for the circuit design as updated with the connection from the clock input of the test point circuit element to the ungated clock input node.

13. The device of claim 12, wherein the one or more processors are further configured to perform operations comprising:

adding additional test point circuit elements to the circuit design to achieve a threshold estimated percentage of LBIST coverage with the number of random input data patterns.

14. The device of claim 13, wherein the one or more processors are further configured to perform operations for:

updating the circuit design with a connection from the clock input of the test point circuit element to the ungated clock input to create an updated circuit design.

15. A non-transitory computer readable medium comprising instructions that, when executed by one or more processors of an electronic design automation (EDA) computing device, cause the device to perform operations comprising:
- accessing a circuit design stored in memory, the circuit design comprising a plurality of circuit elements and clock gating logic elements for the plurality of circuit elements, the plurality of circuit elements comprising a first circuit element;
- automatically selecting a first output node coupled to a data input of the first circuit element for insertion of a test point circuit element between the first output node and the data input of the first circuit element, wherein the test point circuit element comprises a clock input and the data input;
- tracing first clock gating logic elements for one or more circuit elements that contribute to a data state of the first output node to identify one or more ungated clock input nodes;
- selecting a first ungated clock input node of the one or more ungated clock input nodes;
- connecting the clock input of the test point circuit element to the first ungated clock input node to provide a clock signal to the test point circuit element; and
- updating the circuit design with a connection from the clock input of the test point circuit element to the first ungated clock input node to create an updated circuit design.

16. The non-transitory computer readable medium of claim 15, wherein the plurality of circuit elements comprises a second circuit element, and wherein the instructions further cause the one or more processors to perform operations comprising:
- selecting a second output node coupled to a second data input of the second circuit element for insertion of a second test point circuit element between the second output node and the second data input of the second circuit element, wherein the second test point circuit element comprises a second clock input and the second data input;
- identifying second one or more circuit elements of the plurality of circuit elements that contribute to a second data state of the second output node;
- tracing second clock gating logic elements for the second one or more circuit elements that contribute to the second data state of the second output node;
- selecting a second ungated clock input node for a second earliest clock gating logic element of the second clock gating logic elements for the second one or more circuit elements that contribute to the second data state of the second node;
- connecting the second clock input of the second test point circuit element to the second ungated clock input node to provide a second clock signal to the second test point circuit element; and
- updating the circuit design with a second connection from the second clock input of the second test point circuit element to the second ungated clock input node.

17. The non-transitory computer readable medium of claim 16, wherein the second ungated clock input node is the first ungated clock input node.

18. The non-transitory computer readable medium of claim 16, wherein the second ungated clock input node is different than the first ungated clock input node.

19. The non-transitory computer readable medium of claim 15, wherein the instructions further cause the one or more processors to perform operations comprising:
- selecting a number of random input data patterns for the circuit design; and
- estimating a percentage of logical built-in self-test (LBIST) coverage provided for the circuit design as updated with the connection from the clock input of the test point circuit element to the first ungated clock input node.

20. The non-transitory computer readable medium of claim 19, wherein the instructions further cause the one or more processors to perform operations comprising:
- adding additional test point circuit elements to the circuit design to achieve a threshold estimated percentage of LBIST coverage with the number of random input data patterns.

* * * * *